US010968608B2

(12) United States Patent
Larsen et al.

(10) Patent No.: US 10,968,608 B2
(45) Date of Patent: Apr. 6, 2021

(54) WATER DISTRIBUTION (71) Applicant: Desert Blooms LLC, Wilmington, DE (US)

(72) Inventors: Gary Alan Larsen, Tenino, WA (US); Rebecca Lily Oppenheimer, Johannesburg (ZA)

(73) Assignee: DESERT BLOOMS LLC, Wilmington, DE (US)

( * ) Notice: Subject to any disclaimer, the term of this patent is extended or adjusted under 35 U.S.C. 154(b) by 29 days.

(21) Appl. No.: 16/238,394

(22) Filed: Jan. 2, 2019

(65) Prior Publication Data
US 2019/0211957 A1 Jul. 11, 2019

(30) Foreign Application Priority Data

Jan. 8, 2018 (ZA) .................. 2018/00111

(51) Int. Cl.
E03B 3/02 (2006.01)
F16L 41/02 (2006.01)
F16L 41/03 (2006.01)
F16L 39/00 (2006.01)
F16L 43/00 (2006.01)
F16L 29/00 (2006.01)
E03B 3/03 (2006.01)
E04D 13/08 (2006.01)
E03B 1/04 (2006.01)
E03C 1/00 (2006.01)

(52) U.S. Cl.
CPC .................. E03B 3/02 (2013.01); E03C 1/00 (2013.01); F16L 39/00 (2013.01); F16L 41/02 (2013.01); F16L 41/03 (2013.01); F16L 43/00 (2013.01); E03B 3/03 (2013.01); E03B 2001/047 (2013.01); E04D 2013/0853 (2013.01); E04D 2013/0873 (2013.01); F16L 29/002 (2013.01); Y02A 20/108 (2018.01)

(58) Field of Classification Search
CPC ........ E03B 2001/047; E03B 3/02; E03B 3/03; E04D 2013/0853; E04D 2013/0873; Y02A 20/108
See application file for complete search history.

(56) References Cited

U.S. PATENT DOCUMENTS

| 2,032,973 | A | * | 3/1936 | Blake | ........................ | E03B 3/02 |
| | | | | | | 137/121 |
| 8,925,575 | B1 | * | 1/2015 | Taborek | .................... | E03B 3/03 |
| | | | | | | 137/357 |
| 2004/0040598 | A1 | * | 3/2004 | Zimmerman, Jr. | ..... | E03B 1/042 |
| | | | | | | 137/357 |
| 2005/0257433 | A1 | * | 11/2005 | Dussault | .................... | E03B 3/03 |
| | | | | | | 52/12 |

(Continued)

FOREIGN PATENT DOCUMENTS

GB  2270949 A * 3/1994 ............. E04D 13/08

Primary Examiner — Atif H Chaudry
(74) Attorney, Agent, or Firm — Seed Intellectual Property Law Group LLP (57) ABSTRACT A water distribution pipe comprises an elbow formation along its length, an aperture-defining formation defining an aperture in a radially distal wall of the elbow formation along a radius of the curvature of the elbow, and an openable closure that is mounted or mountable to the aperture-defining formation and that closes the aperture.

9 Claims, 3 Drawing Sheets (56) References Cited

U.S. PATENT DOCUMENTS

| | | | |
|---|---|---|---|
| 2009/0166275 A1* | 7/2009 | Burke | E03B 3/03 |
| | | | 210/137 |
| 2010/0193046 A1* | 8/2010 | Moroder | F16L 55/24 |
| | | | 137/357 |
| 2012/0305492 A1* | 12/2012 | Byrne, Jr. | E03B 1/042 |
| | | | 210/744 |

* cited by examiner

WATER DISTRIBUTION

FIELD OF THE INVENTION

THIS INVENTION relates to water distribution. The invention provides a water distribution pipe. The invention also provides a water distribution assembly. The invention further provides a water distribution kit. The invention still further provides a water distribution installation

SUMMARY OF THE INVENTION

IN ACCORDANCE WITH THE INVENTION, BROADLY, IS PROVIDED a water distribution pipe which comprises two open ends and an aperture defined in the pipe between the ends by an aperture defining formation, which aperture is closed by an openable closure that is mounted or mountable to the aperture-defining formation and that closes the aperture.

IN ACCORDANCE WITH ONE ASPECT OF THE INVENTION IS PROVIDED a water distribution pipe which comprises
  an elbow formation along its length;
  an aperture-defining formation defining an aperture in a radially distal wall of the elbow formation along a radius of the curvature of the elbow; and
  an openable closure that is mounted or mountable to the aperture-defining formation and that closes the aperture.

It will be appreciated that since the closure is mounted or mountable to the aperture-defining formation, the invention includes within its scope and as separate aspect thereof both an assembled water distribution pipe and a water distribution pipe kit.

With reference to the openable closure, "mounted to" includes "integral with" in its meaning.

The closure may be a removable closure, which is openable by removing it from the aperture-defining formation.

In one embodiment of the invention, the closure may be configured that, when it removed, it is permanently removed. For example, the closure may be in the form of a press-tab that is frangibly connected to the aperture-defining formation.

In another embodiment of the invention, and more preferably in fact, the closure may be selectively removable from and returnable to the aperture-defining formation, thereby selectively to open and close the aperture.

In either of the abovementioned two embodiments, the closure may be sectioned, i.e. it may comprise a plurality of individually openable sections, such that one or more of the sections can selectively be removed, thus selectively partly or fully to open the closure.

Alternatively, the closure may be unitary, and thus its removal would fully open the aperture and its return would fully close the aperture.

Instead of being a removable closure, the closure may be a valve that in use remains mounted to the aperture, and that is adjustable selectively to open and close the aperture. Such a valve may be provided by a valve member that is selectively removable from the aperture-defining formations, but would not typically be removed in order to open the aperture, which would be achieved by adjustment of the valve. This does not exclude, however, a possibility of opening the aperture by removing the valve member from a condition in which it is mounted to the aperture-defining formations.

Typically, the valve would be configured to open the aperture to varying degrees, i.e. from partly open to fully open.

In the sense used above, "fully open" means "to the fullest extent possible" with reference to the configuration of the closure. In some embodiments, the whole of the aperture, thus delimited by the aperture-defining formation, may be open in a "fully open" condition. In other embodiments, it may not.

The distribution pipe may have openings to its interior on respective sides of the elbow formation. In use, one opening may function as an inlet and the other opening may function as an outlet.

The openings may be defined by respective terminal formations of the elbow formation, in which case the distribution pipe may effectively consist of the elbow formation. In one embodiment of the invention, the distribution pipe may, particularly when it consists of the elbow formation, be an elbow connector, or wye, for connecting two lengths of pipe to one another in use.

IN ACCORDANCE WITH ANOTHER ASPECT OF THE INVENTION IS PROVIDED a water distribution assembly which comprises
  a water distribution pipe in accordance with the invention, as hereinbefore described;
  an additional water pipe having at least one inlet thereto, defined by an inlet formation, and at least one outlet therefrom, defined by an outlet formation; and
  a connecting pipe that extends between the aperture of the water distribution pipe and one of the at least one inlets of the additional water pipe, thus establishing fluid communication, through the connecting pipe, between the interiors of the water distribution pipe and the additional water pipe when the closure of the water distribution pipe is partially or fully open.

The additional water pipe may be a water distribution pipe according to the invention, and thus the assembly may include a pair of the water distribution pipes according to the invention. In such a case, the inlet of the additional water distribution pipe to which the connecting pipe extends may be provided by the aperture of the additional water distribution pipe.

In another embodiment of the invention, the additional water pipe may be a water distribution pipe according to the invention, without a closure. Such a water pipe is hereinafter described as a "modified water distribution pipe". In such a case, as with the water distribution pipe, the inlet of the modified water distribution pipe to which the connecting pipe extends may be provided by the aperture of the modified water distribution pipe.

The water distribution pipes of the pair of water distribution pipes, or the water distribution pipe and the modified water distribution pipe, may be substantially identically dimensioned.

The water distribution pipes of the pair of water distribution pipes, or the water distribution pipe and the modified water distribution pipe, may be arranged relative to each other such that their apertures generally face one another. Thus, the connecting pipe would typically be straight.

The water distribution pipes of the pair of water distribution pipes, or the water distribution pipe and the modified water distribution pipe, may be arranged in a single plane.

In one embodiment of the invention, the distribution pipes, or the water distribution pipe and the modified water distribution pipe, may be arranged such that they mirror one another across a plane that separates them.

The assembly may include water conveying pipes that are respectively connected to the water distribution pipes of the pair of water distribution pipes, or to the water distribution pipe and the modified water distribution pipe. The water conveying pipes may typically, respectively, lead to the inlets and lead from the outlets of the water distribution pipes.

IN ACCORDANCE WITH A FURTHER ASPECT OF THE INVENTION IS PROVIDED a water distribution kit which comprises a water distribution pipe in accordance with the invention, as hereinbefore described;

an additional water pipe having at least one inlet thereto, defined by an inlet formation, and at least one outlet therefrom, defined by an outlet formation; and a connecting pipe that is connectable to the aperture-defining formation of the water distribution pipe and to one of the at least one inlet of the additional pipe, such that the connecting pipe would in use extend between the aperture of the water distribution pipe and the one of the at least one inlets of the additional water pipe, thus establishing fluid communication, through the connecting pipe, between the interiors of the water distribution pipe and the additional water pipe when the closure of the water distribution pipe is partially or fully open.

The additional water pipe may be a water distribution pipe according to the invention, and thus the assembly may include a pair of the water distribution pipes according to the invention, in which case the water distribution assembly may be configured as hereinbefore described in terms of such an embodiment of the assembly.

In another embodiment of the invention, the additional water pipe may be a modified water distribution pipe as hereinbefore described.

The water distribution pipe, the additional water pipe, the modified water distribution pipe, and the connecting pipe, as well as their interconnectability, may be as hereinbefore described with reference to the water distribution assembly of the invention.

IN ACCORDANCE WITH STILL A FURTHER ASPECT OF THE INVENTION IS PROVIDED a water distribution installation which comprises a water reservoir; and a water distribution assembly in accordance with the invention as hereinbefore described, wherein the water distribution assembly is arranged to supply water to the water reservoir along a water supply pipe provided by one of the water distribution pipe and the additional water pipe of the assembly.

Preferably, the water distribution assembly is also arranged to withdraw water from the water reservoir along a water withdrawal pipe provided by the other of the water distribution pipe and the additional water pipe of the assembly.

Inherently, in accordance with the invention the water distribution pipe and additional water pipe of the assembly are also arranged for one to supply the other with water, through the connecting pipe when the closure of the water distribution pipe is partially or fully open.

The additional water pipe may be a water distribution pipe according to the invention, and thus the assembly may include a pair of the water distribution pipes according to the invention, in which case the water distribution assembly may be configured as hereinbefore described in terms of such an embodiment of the assembly.

In another embodiment of the invention, the additional water pipe may be a modified water distribution pipe as hereinbefore described with reference to the assembly of the invention.

It will be appreciated that the installation is not limited to one water reservoir or to one water distribution assembly. It is also not limited to one water distribution assembly for any one water reservoir that may form part of the installation. Thus, one water reservoir may have more than one assembly arranged with respect to it in the manner describes. The singular form is being used above in relation to the current aspect of the invention merely for the sake of clarity, and use thereof should not detract from the scope of the generality of the functional principles that are provided for below.

It will further be appreciated that the water supply pipe and the water withdrawal pipe of the water distribution assembly are, in accordance with the invention, connected by means of the connecting pipe, as described in relation to the water distribution assembly aspect of the invention, as also pointed out earlier in relation to the present aspect of the invention.

The installation may also comprise an external water supply, from which water is, in use, supplied to the water reservoir along the water supply pipe.

The external water supply may be a natural water supply. The external water supply may, in particular, be a rainwater collector. Preferably, the installation includes at least one rainwater collector that is a water supply for the reservoir.

Arrangement of the water distribution assembly to supply water to the water reservoir along the water supply pipe; and to withdraw water from the water reservoir along the water withdrawal pipe may respectively be through fluid communication between the outlet opening of the water supply pipe and the interior of the water reservoir; and fluid communication between the inlet opening of the water withdrawal pipe and the interior of the water reservoir.

The installation may include one or more additional water reservoirs and one or more additional water distribution assemblies respectively associated with such one or more additional water reservoirs, that are arranged as described above in relation to the current aspect of the invention.

For ease of reference, the first-mentioned water reservoir of the current aspect of the invention is hereinafter referred to as "the first" water reservoir, and the first-mentioned water distribution assembly is hereinafter referred to as "the first" water distribution assembly, to distinguish from such additional water reservoirs and additional water distribution assemblies.

Such one or more additional water reservoirs would typically be arranged below the first water reservoir, and respectively one above the other.

The installation is hereinafter described with reference to an embodiment in which it comprises the first water reservoir and the first water distribution assembly, and one additional, or second, water reservoir and with one additional, or second, water distribution assembly arranged relative to the additional water reservoir in the manner described above for the first water reservoir and the first water distribution assembly.

The first water reservoir may be a water supply for the additional water reservoir, to supply water to the additional water reservoir along the water supply distribution pipe of the additional water distribution assembly. Thus, the water supply pipe of the additional water distribution assembly may be in fluid communication with the water withdrawal pipe of the first water distribution assembly. It must be borne in mind in this regard that the first water reservoir may, in accordance with the invention, have additional water distribution assemblies arranges with respect to it in the same manner described in relation to the first water distribution assembly, but not necessarily in a water supply relationship with the additional water reservoir currently being discussed.

As an alternative, or in addition, the rainwater collector may be a water supply for the additional water reservoir, to supply water to the additional water reservoir directly, i.e. not via the first water reservoir, along the water supply distribution pipe of the additional water distribution assembly. Thus, there may be direct fluid communication between the rainwater collector and the water supply pipe of the additional water distribution assembly in addition or in alternative to fluid communication between the water withdrawal pipe of the first water distribution assembly and the water supply pipe of the additional water distribution assembly.

Configuration of the installation for supply of water to the additional water reservoir, along the water supply pipe of the additional water distribution assembly, may thus be by way of operative, i.e. fluid communicating, connection of the water withdrawal pipe of the first water distribution assembly and the water supply pipe of the additional water distribution assembly, such that water is in use by default supplied to the additional water reservoir from the first water reservoir, e.g. by overflow from the first reservoir into the water withdrawal pipe of the first water distribution assembly.

In a case wherein the water distribution assemblies comprise respective pairs of the water distribution pipes of the invention, or one of the water distribution pipes of the invention and one modified water distribution pipe as hereinbefore described, by partly or fully opening the aperture of the water distribution pipe of the first water distribution assembly, the first reservoir may be partly or fully bypassed, thus allowing for fluid communication, in sequence from the water supply pipe of the first water distribution assembly, to the water withdrawal pipe of the first water distribution assembly (avoiding the first reservoir),
to the water supply pipe of the additional water distribution assembly, and
finally into the additional water reservoir.

The above features of the invention will be more clearly understood with reference to the following non-limiting examples thereof, and to the accompanying drawings.

BRIEF DESCRIPTION OF THE DRAWINGS

THE INVENTION WILL NOW BE DESCRIBED IN MORE DETAIL with reference to the accompanying drawings in which.

DETAILED DESCRIPTION OF THE INVENTION

REFERRING TO THE DRAWINGS, and in particular to FIGS. 1A to 1D, reference numeral 10 generally indicates one embodiment of a water distribution assembly in accordance with the invention, which is shown in the figures in three dimensional view from various angles relative to it.

The water distribution assembly 10 comprises a pair of water distribution pipes 11 comprising water distribution pipes 12a, 12b in accordance with the invention.

Each water distribution pipe 12a, 12b comprises
an elbow formation 14 along its length;
an aperture 16 that is defined in a radially distal wall of the elbow formation along a radius of the curvature of the elbow; and
an openable closure 18 that closes the aperture.

The aperture 16 is, in each case, defined by surrounds thereof, provided by its associated water distribution pipe 12a, 12b, which surrounds constitute aperture defining formations.

Each closure 18 is in the form of a push-tab that is frangibly connected to its associated water distribution pipe 12a, 12b or, more specifically, to the aperture defining formation of the aperture that it closes. Therefore, each aperture 16 can be opened, or more accurately can be revealed, by pressing on its associated closure 18 to break it loose from its associated water distribution pipe 12a, 12b or, more specifically, from the aperture defining formation of the aperture that it closes.

In accordance with the invention, one or more of the closures 18 may be in the form of selectively removable and returnable inserts, that can selectively be removed from a closing position to an open position, and returned to a closed position. In one preferred embodiment, one or more of the closures 18 may be in the form of such selectively removable and returnable inserts, that are in use not removed from their associated apertures 18 to open the aperture, but are adjustable selectively to open their associated apertures to varying degrees. This embodiment is discussed in more detail below, with reference to FIGS. 3A-C and 4.

Although not illustrated as such, it is noted that the closures 18 may be sectioned, i.e. may comprise a plurality of individually openable sections, such that one or more of the sections can selectively be opened, thus selectively partly or fully to open the apertures 16, i.e. selectively partly or fully to reveal the apertures 16.

Each distribution pipe 12a, 12b has openings 20, 22 to its interior on respective sides of its elbow formation 14. In use, the opening 20 functions as an inlet and the other opening 22 functions as an outlet.

The openings 20, 22 are effectively defined by terminal formations of the elbow formation 14. Thus, the water distribution pipes 12a, 12b effectively consist of their respective elbow formations 14. In this regard, the water distribution pipes 12a, 12b may be regarded as wyes in that, as discussed below with reference to FIG. 2, they would in use typically connect to longer conveying pipes at respective ends thereof.

The water distribution assembly 10 further comprises a connecting pipe 24 that is connected to the water distribution pipes 12a, 12b of the pair of water distribution pipes 11 and extends between the apertures 16 of the water distribution pipes 12a, 12b of the pair of water distribution pipes 11, such that fluid communication would be established between the interiors of the water distribution pipes 12a, 12b of the pair of water distribution pipes 11 when their respective closures 18 are partially or fully opened.

The water distribution pipes 12a, 12b of the pair of water distribution pipes 11 are substantially identical, i.e. the water distribution pipes 12a, 12b of the pair of water distribution pipes 11 are of substantially identical shape and size and configuration.

The water distribution pipes 12a, 12b of the pair of water distribution pipes 11 are arranged relative to each other such that their apertures 16 generally face one another. Thus, the connecting pipe 24 is straight.

The water distribution pipes 12a, 12b of the pair of water distribution pipes 11 are arranged in a single plane. Furthermore, the distribution pipes 12a, 12b are arranged such that they mirror one another across a plane that separates them.

It will be appreciated that, in use, water can bypass the opening 22 of the water distribution pipe 12a and the opening 20 of the water distribution pipe 12b, thus moving straight (in the sense of avoiding the opening 22 of the water distribution pipe 12a and the opening 20 of the water distribution pipe 12b) from the opening 20 of the water distribution pipe 12a to the opening 22 of the water distribution pipe 12b. This is an important feature of the present invention, as would appear from the description of the water distribution installation that follows.

Of course, it is not strictly speaking necessary for both pipes 12a, 12b of the assembly 10 to be water distribution pipes according to the invention. One of the pipes 12a, 12b may be another pipe, not in accordance with the invention, an inlet of which is connected to the aperture of the water distribution pipe according to the invention by means of the connecting pipe 24, thus being capable of being supplied with water by means of the connecting pipe 24.

For example, the additional water pipe, which may be either pipe 12a or pipe 12b, may be a water distribution pipe according to the invention, which does not have a closure for its aperture. Such a pipe is hereinafter described as a "modified water distribution pipe", in accordance with its description in the summary of the invention. In such a case, water flow through the connecting pipe 24 would be controlled (i.e. allowed and disallowed) only by the closure of the water distribution pipe according to the invention that is included in the assembly 10. Reference in this regard can be made also to FIGS. 3A-C and 4, below.

Figure 1A:
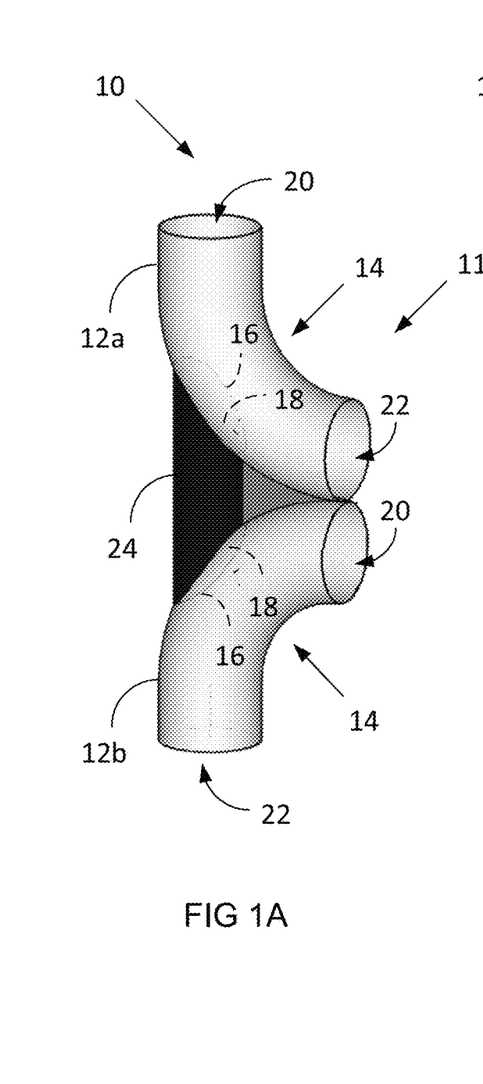
FIGS. 1A-D show, in three dimensional view from various angles thereof, a water distribution assembly in accordance with the invention.
Figure 1B:
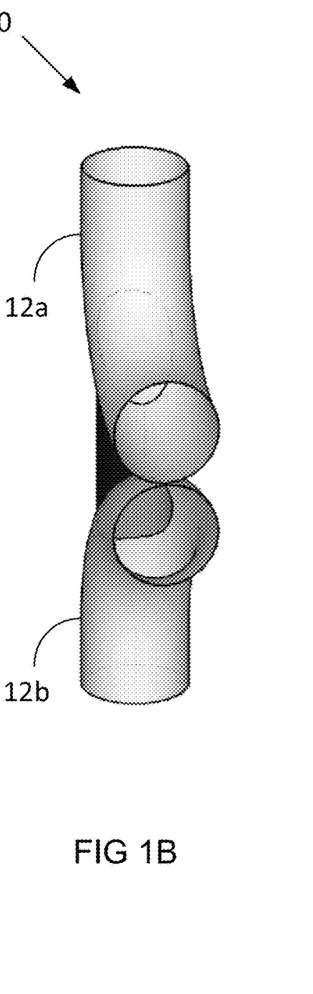
Figure 1C:
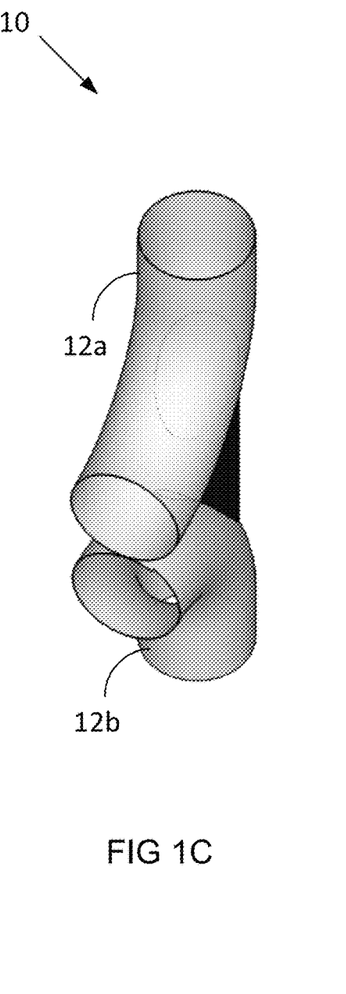
Figure 1D:
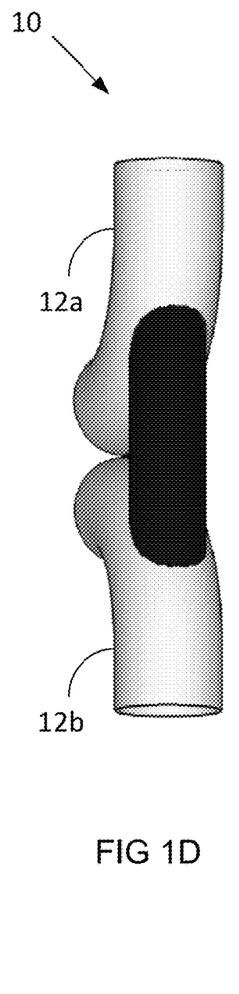
Figure 2:
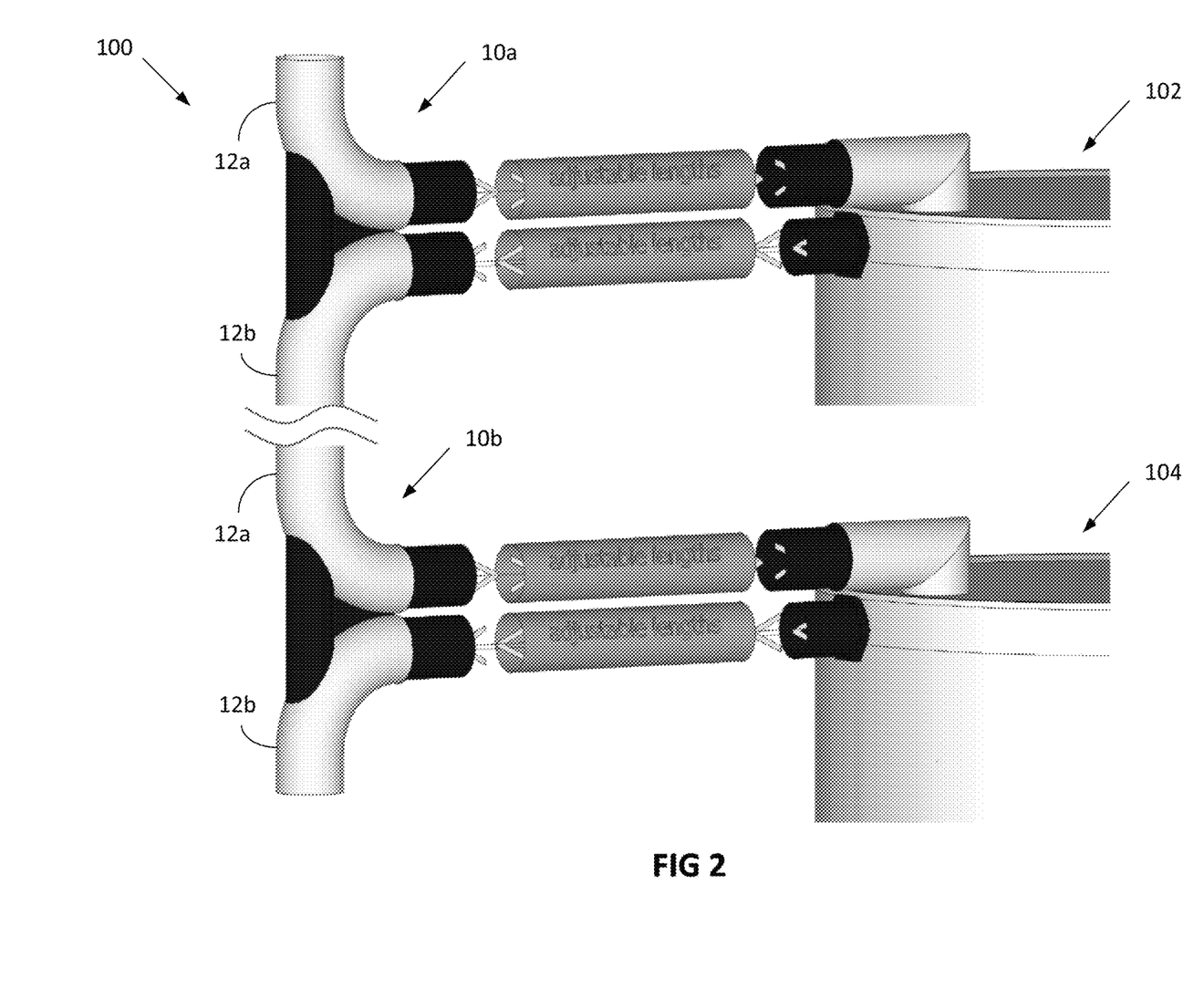
FIG. 2 shows, in three dimensional view, a water distribution installation in accordance with the invention.

Referring now to FIG. 2, reference numeral 100 generally indicates a water distribution installation in accordance with the invention.

The water distribution installation 100 includes a first water reservoir 102 and an additional water reservoir 104. The additional water reservoir 104 is arranged operatively below the first water reservoir 102. The reservoirs are not being illustrated in full.

The water distribution installation 100 also includes two of the water distribution assemblies 10 hereinbefore described, comprising a first water distribution assembly 10a and an additional, or second, water distribution assembly 10b.

The first water distribution assembly 10a is arranged
  to supply water to the first water reservoir 102 along a water supply pipe 12a of the first water distribution assembly 10a; and
  to withdraw water from the first water reservoir 102 along a water withdrawal pipe 12b of the first water distribution assembly 10a.

The additional water distribution assembly 10b is arranged
  to supply water to the additional water reservoir 102 along a water supply pipe 12a of the additional water distribution assembly 10b; and
  to withdraw water from the additional water reservoir 102 along a water withdrawal pipe 12b of the additional water distribution assembly 10b.

In the illustrated embodiment, the water supply and water withdrawal pipes 12a, 12b are in the case of assembly 10a and assembly 10b, of course, water distribution pipes in accordance with the invention, and are therefore referred to as such hereinafter, i.e. as "water supply distribution pipe" and "water withdrawal distribution pipe".

Although not illustrated, the installation 100 comprises an external water supply in the form of a rainwater collector, which supplies water to the water supply distribution pipe 12a of the first water distribution assembly 10a.

It is clear from FIG. 2 that arrangement of the first water distribution assembly 10a
  to supply water to the first water reservoir 102 along the water supply distribution pipe 12a of the first water distribution assembly 10a; and
  to withdraw water from the first water reservoir 102 along the water withdrawal distribution pipe 12b of the first water distribution assembly 10a, is through
  fluid communication between the outlet opening 22 of the water supply distribution pipe 12a of the first water distribution assembly 10a and the interior of the first water reservoir 102; and
  fluid communication between the inlet opening 20 of the water withdrawal distribution pipe 12b of the first water distribution assembly 10a and the interior of the first water reservoir 102.

Similarly, it is also clear from FIG. 2 that arrangement of the additional water distribution assembly 10b
  to supply water to the additional water reservoir 104 along the water supply distribution pipe 12a of the additional water distribution assembly 10b; and
  to withdraw water from the additional water reservoir 104 along the water withdrawal distribution pipe 12b of the additional water distribution assembly 10b, is through
  fluid communication between the outlet opening 22 of the water supply distribution pipe 12a of the additional water distribution assembly 10b and the interior of the additional water reservoir 104; and
  fluid communication between the inlet opening 20 of the water withdrawal distribution pipe 12b of the additional water distribution assembly 10b and the interior of the additional water reservoir 104.

The first water reservoir 102 is arranged to be a water supply for the additional water reservoir 104, to supply water to the additional water reservoir 104 along the water supply distribution pipe 12a of the additional water distribution assembly 10b.

As an alternative, or in addition, the rainwater collector is also water supply for the additional water reservoir 104, to supply water to the additional water reservoir 104 directly, i.e. not via the first water reservoir 102, along the water supply distribution pipe 12a of the additional water distribution assembly 10b.

Configuration of the installation 100 for supply of water to the additional water reservoir 104, along the water supply distribution pipe 12a of the additional water distribution assembly 10b, is operative, i.e. fluid communicating, connection of the water withdrawal distribution pipe 12b of the first water distribution assembly 10a and the water supply distribution pipe 12a of the additional water distribution assembly 10b, such that water is in use by default supplied to the additional water reservoir from the first water reservoir 102. Such supply is, in the illustrated embodiment, overflow from the first water reservoir 102

For direct supply of water from the rainwater collector to the additional water reservoir 104, the closures 18 closing the apertures of the first water distribution assembly 10*a* are partly or fully opened, thereby bypassing the opening 22 of the water supply distribution pipe 12*a* and the opening 20 of the water withdrawal distribution pipe 12*b* of the first water distribution assembly 10*a* partly or fully, as hereinbefore described, and therefore also bypassing the first water reservoir 102 partly or fully. In other words, fluid communication is established, in sequence, from the water supply distribution pipe 12*a* of the first water distribution assembly 10*a*, to the water withdrawal distribution pipe 12*b* of the first water distribution assembly 10*a* (via its connection pipe 24), to the water supply distribution pipe 12*a* of the additional water distribution assembly 10*b*, to the additional water reservoir 104, and thus without necessarily involving the first water reservoir 102.

It will be appreciated that, in accordance with the invention, a plurality of additional water reservoirs may be included in the installation, arranged below the additional water reservoir 104, to be supplied and to supply one another with water in the same manner in which the additional water reservoir 104 is supplied with water from the first water reservoir 102 and from the rainwater collector. In such an installation, the additional water reservoir immediately above a following additional water reservoir would then typically serve the function of the first water reservoir 102 in relation to the additional water reservoir 104.

As in the case of the assembly, it is not strictly speaking necessary for both pipes 12*a*, 12*b* of both assemblies 10*a*, 10*b* to be water distribution pipes according to the invention. One of the pipes 12*a*, 12*b* may, in either or in both cases, be another pipe, not in accordance with the invention, an inlet of which is connected to the aperture of the water distribution pipe according to the invention by means of the connecting pipe 24, thus being capable of being supplied with water by means of the connecting pipe 24. For example, for the installation to work in a manner similar to the installation 100, the additional water pipe may be a water distribution pipe according to the invention, which does not have a closure for its aperture, i.e. a "modified water distribution pipe" as hereinbefore described. In such a case, water flow through the connecting pipe 24 would be controlled only by the closure of the water distribution pipe according to the invention that is included in the assembly 10*a*/10*b*.

Figures 3A, 3B, 3C:
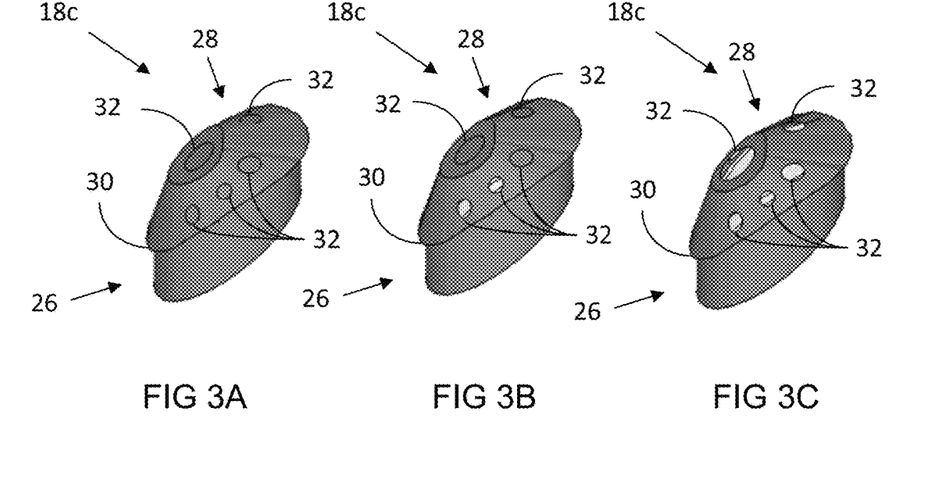
FIGS. 3A-C show, in three dimensional views, an alternative closure for a water distribution pipe according to the invention.

Referring now to FIGS. 3A-C, reference numeral 18*a* indicates another embodiment of a closure for a water distribution pipe according to the invention.

The closure 18*a* comprises a body including a mounting section 26 and an adjusting section 28.

The mounting section 26 and the adjusting section 28 are separated by a shoulder 30.

The adjusting section 28 has apertures 32 defined in it. Complementary apertures, that are not visible in FIG. 3A, are defined in the mounting section 26.

The adjusting section 28 is rotatably mounted to the mounting section 26, such that rotation thereof relative to the mounting section brings progressively more of the apertures 32 into register with the apertures that are defined in the mounting section 26. It will be appreciated that, thus, flow of liquid from the adjusting section 28 through the mounting section 26 is allowed, and progressively to a greater extent as more apertures are thus brought into register, as seen by comparing FIGS. 3A (closed), 3B (partially open) and 3C (fully open).

Figure 4:
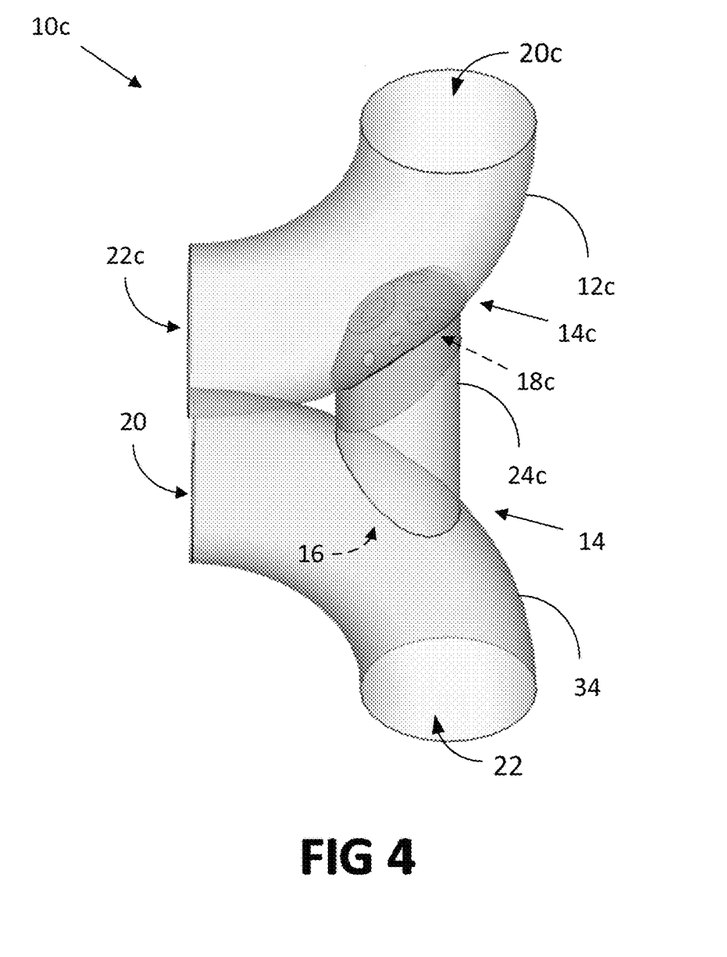
FIG. 4 shows, in three dimensional view, an alternative water distribution assembly according to the invention.

Referring now to FIG. 4, reference numeral 10*c* indicates a further embodiment of a water distribution assembly according to the invention.

Parts of the assembly 10*c* shared with the assemblies 10*a* and 10*b*, are designated by the same reference numerals, with the suffix "c".

The assembly 10*c* is different from the assemblies 10*a* and 10*b* in that it does not comprise a pair of water distribution pipes according to the invention, but only one, designated as 12*c*.

Furthermore, the assembly 10*c* is also different from the assemblies 10*a* and 10*b* I that the water distribution pipe 12*c* has the closure 18*c* mounted in its aperture.

The other water pipe, which is an additional water pipe in accordance with the assembly of the invention, is a modified water distribution pipe as hereinbefore described, and is designated as 34.

As previously described, the modified water distribution pipe 34 is identical to the water distribution pipes 12*a*, 12*b*, except that it omits a closure for its aperture. Thus, flow of water through the connecting pipe 24*c* is controlled only by the closure 18*c*.

It is noted that inlets and outlets, curvature and aperture of the pipe 34 are indicated by the same reference numerals as for the pipes 12 illustrated in FIGS. 1A-D and 2, for convenience.

It will be appreciated that the pipes 12*c* and 34 can be swopped around readily, in which case their inlets and outlets would change around functionally.

The assembly 10*c* is a ready substitute for either or both of the assemblies 10*a* and 10*b*.

DISCUSSION

The bypass function of the water distribution assembly of the invention, particularly when implemented in a water distribution installation in accordance with the invention, is regarded as a particularly advantageous feature of the invention, since it enables for a plurality of water distribution regimes to be implemented in a water distribution installation (or network for that matter).

For example, in a high flow situation, bypass may be required due to aggressive overflow of higher water reservoirs relative to lower reservoirs. Conversely, in a low flow situation, bypass may be required in order to ensure balanced distribution of water to lower reservoirs where there may not be overflow from higher reservoirs.

The invention claimed is:

1. A water distribution assembly, comprising:
   a water distribution pipe having a water distribution pipe length, the water distribution pipe including:
      an elbow formation along said water distribution pipe length;
      an aperture-defining formation defining an aperture in a radially distal wall of the elbow formation along a radius of curvature of the elbow; and
      an openable closure that is mounted or mountable to the aperture-defining formation and that closes the aperture;
   an additional water pipe having at least one inlet thereto, defined by an inlet formation, and at least one outlet therefrom, defined by an outlet formation; and
   a connecting pipe that extends between the aperture of the water distribution pipe and one of the at least one inlets of the additional water pipe, thus establishing fluid communication through the connecting pipe, between a water distribution pipe interior of the water distribution pipe and an additional water pipe interior of the additional water pipe when the openable closure of the water distribution pipe is partially or fully open;

wherein the additional water pipe is a second water distribution pipe having a second water distribution pipe length and includes:
- a second elbow formation along said second water distribution pipe length;
- a second aperture-defining formation defining a second aperture in a second radially distal wall of the second elbow formation along a second radius of curvature of the second elbow formation; and
- a second openable closure that is mounted or mountable to the second aperture-defining formation and that closes the second aperture.

2. The water distribution assembly according to claim 1, wherein the openable closure of the water distribution pipe is a removable closure, which is openable by removing it from the aperture-defining formation.

3. The water distribution assembly according to claim 1, wherein the openable closure of the water distribution pipe is a valve that in use remains mounted to the aperture, and that is adjustable selectively to open and close the aperture.

4. The water distribution assembly according to claim 1, wherein the water distribution pipe has openings to an interior of the water distribution pipe on respective sides of the elbow formation, said openings being defined by respective terminal formations of the elbow formation.

5. A water distribution installation, comprising:
a water reservoir; and
the water distribution assembly of claim 1,
wherein the water distribution assembly is arranged to supply water to the water reservoir along a water supply pipe that comprises either the water distribution pipe of the water distribution assembly or the additional water pipe of the water distribution assembly.

6. A water distribution kit, comprising:
a water distribution pipe having a water distribution pipe length, the water distribution pipe including:
- an elbow formation along said water distribution pipe length;
- an aperture-defining formation defining an aperture in a radially distal wall of the elbow formation along a radius of curvature of the elbow; and
- an openable closure that is mounted or mountable to the aperture-defining formation and that closes the aperture;

an additional water pipe having at least one inlet thereto, defined by an inlet formation, and at least one outlet therefrom, defined by an outlet formation; and a connecting pipe that is connectable to the aperture-defining formation of the water distribution pipe and to one of the at least one inlet of the additional water pipe, such that the connecting pipe extends between the aperture of the water distribution pipe and the one of the at least one inlets of the additional water pipe, thus establishing fluid communication through the connecting pipe, between a water distribution pipe interior of the water distribution pipe and an additional water pipe interior of the additional water pipe when the openable closure of the water distribution pipe is partially or fully open;

wherein the additional water pipe is a second water distribution pipe having a second water distribution pipe length and includes:
- a second elbow formation along said second water distribution pipe length;
- a second aperture-defining formation defining a second aperture in a second radially distal wall of the second elbow formation along a second radius of curvature of the second elbow formation; and
- a second openable closure that is mounted or mountable to the second aperture-defining formation and that closes the second aperture.

7. The water distribution kit according to claim 6, wherein the openable closure of the water distribution pipe is a removable closure, which is openable by removing it from the aperture-defining formation.

8. The water distribution kit according to claim 6, wherein the openable closure of the water distribution pipe is a valve that in use remains mounted to the aperture, and that is adjustable selectively to open and close the aperture.

9. The water distribution kit according to claim 6, wherein the water distribution pipe has openings to an interior of the water distribution pipe on respective sides of the elbow formation, said openings being defined by respective terminal formations of the elbow formation.

* * * * *